Feb. 5, 1946. H. L. PAUL 2,394,471
VALVE
Filed April 22, 1944 2 Sheets-Sheet 1
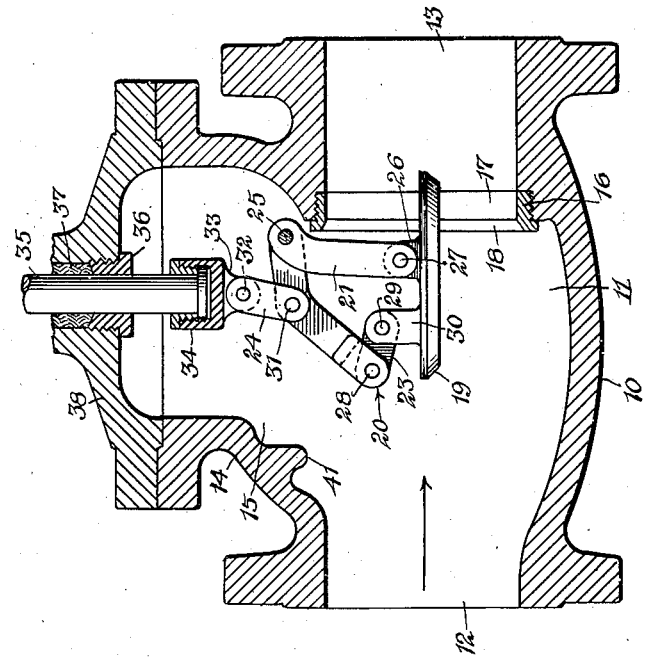
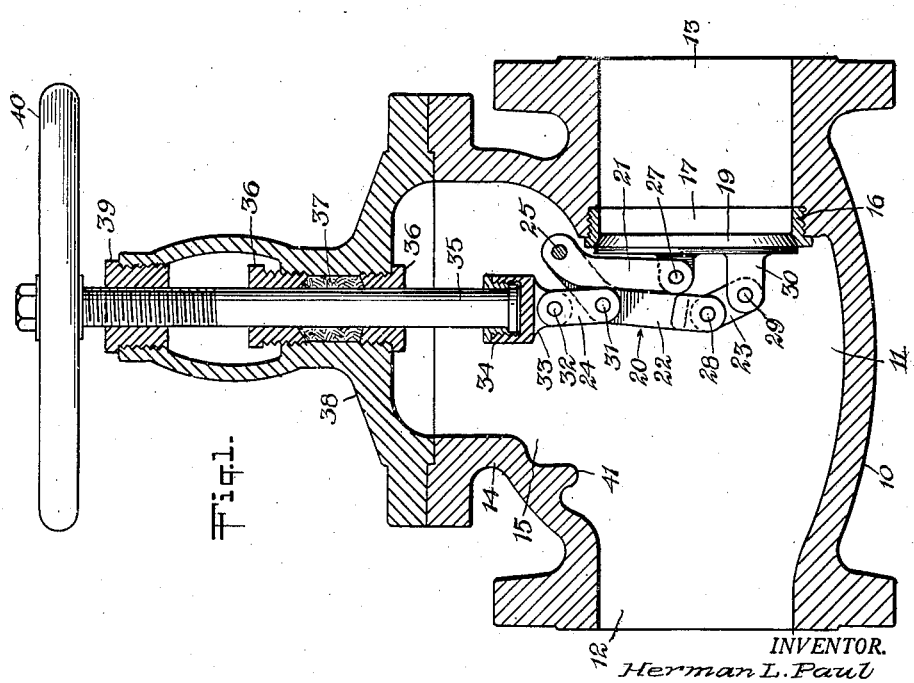
INVENTOR.
Herman L. Paul

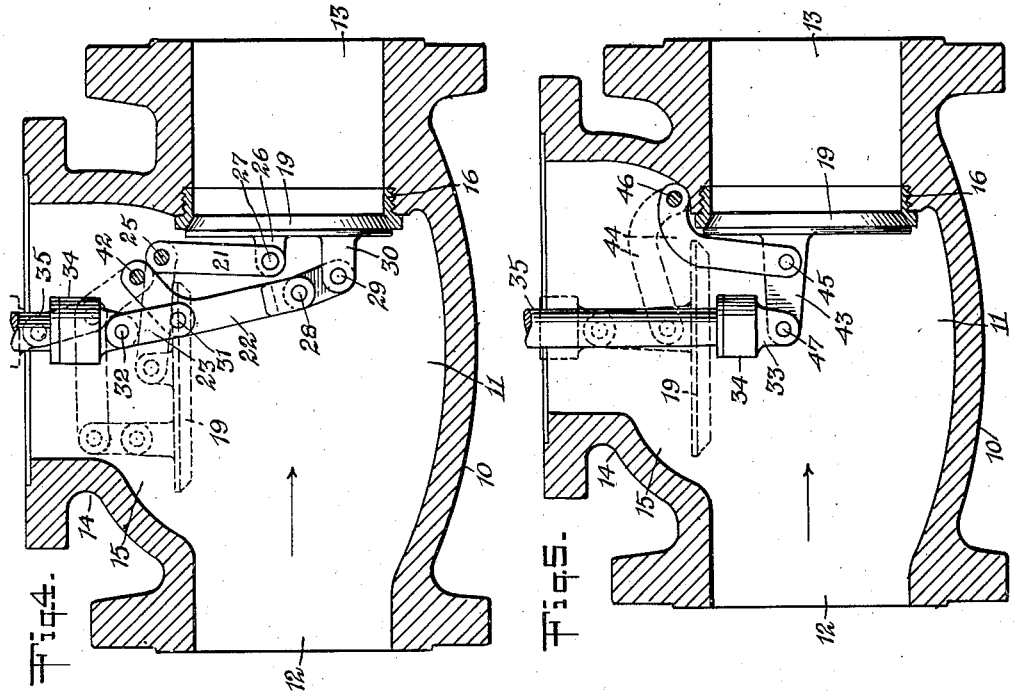

Patented Feb. 5, 1946

2,394,471

UNITED STATES PATENT OFFICE 2,394,471

VALVE

Herman L. Paul, New Rochelle, N. Y.

Application April 22, 1944, Serial No. 532,241

10 Claims. (Cl. 251—17)

This invention relates to a valve which may be used advantageously in high pressure systems.

The principal object of the invention is the provision of a valve of such character that the valve member or body may be moved between a closed position on its seat, and a fully open position clear of or entirely withdrawn from the flow passage, to reduce resistance and friction to a minimum.

A further object is the provision of a valve having the aforesaid attributes with the additional advantage that the valve member or body in its closed position will be balanced in such manner that the pressure of the fluid at the inlet side will assist in effecting the opening movement of the valve; that during the travel of the valve member or body to the open and closed position it will be unbalanced in order to offer the least obstruction, resistance and friction to the flow of fluid through the valve; and that the valve member or body in the fully open position will offer no obstruction and afford a maximum flow of fluid according to the size of the valve.

Other advantages are the valve is easy to operate, gives an uninterrupted flow, and is otherwise of substantial and efficient design.

The nature of the invention and its distinguishing features and advantages will appear when the following specification is read in connection with the accompanying drawings, in which:

Fig. 1 is a vertical longitudinal sectional view of a valve embodying the invention, the valve member or body being shown in the closed position.

Fig. 2 is a view similar to Fig. 1 but showing the valve member or body in a partly open position, portions of the valve being broken away.

Fig. 3 is a view similar to Fig. 1 but showing the valve member of body in the fully open position, portions of the valve being broken away.

Fig. 4 is a central vertical longitudinal sectional view of the valve showing a modification, the bonnet being removed and the stem broken off, the valve member being shown in the closed position in full lines and in the open position in dotted lines.

Fig. 5 is a view similar to Fig. 4, but showing a further modification.

Referring now more particularly to Figs. 1, 2 and 3, it will be apparent there is shown a valve which includes a casing 10 having a flow passage 11 extending therethrough with an inlet end 12 and an outlet end 13. The casing 10 has an extension 14 providing a space 15 above the passage 11 in communication therewith. The passage 11 extends straight through the casing. A seat 16 is located in the passage 11 coaxially thereof between the inlet and the outlet but nearer the latter than the former. This seat may be of any suitable form. In the present instance, the seat is replaceable and consists of a ring in threaded engagement with the casing with an internal circular surface 17 approximating the passage and a conical surface 18. A valve member or body 19 in the form of a disk cooperates with the seat 16 to control the flow of the fluid. The valve serves advantageously in steam lines but obviously it may be used to control the flow of gas or liquid. The disk 19 is beveled to conform to conical surface 18 as well as the circular surface 17 of the seat 16.

Means 20 is provided which is operable to cause the movements of the disk 19 to the closed position on the seat, to the open position into the space 15 clear of the passage 11, and vice versa. Also, to change the angularity of the disk during its travel to the open and closed position. Said means 20 may be diversely formulated. As shown in Figs. 1, 2 and 3, said means 20 consists of links 21, 22, 23 and 24. The link 21 has the opposite ends thereof pivotally connected with a fixed pivot 25 and the disk 19, respectively. The pivot 25 is supported by the casing 10. The connection of the link 21 to the disk 19 is accomplished by a lug 26 and a pivot 27 extending through the link 21 and the lug 26. The lug 26 is on the inlet side of the disk and near the center thereof. One end of the link 22 is pivotally connected with the pivot 25 and its opposite end is pivotally connected, as at 28, with one end of the link 23 whose other end is pivotally connected, as at 29, with a lug 30 on the disk at the inlet side thereof and in spaced relation to the lug 26. The lugs 26 and 30 are at opposite sides respectively of the geometrical center of the disk.

One end of the link 24 is pivotally connected, as at 31, with the link 22 between the ends thereof, and the opposite end of the link 22 is pivotally connected, as at 32, with a lug 33 on a coupling 34. The coupling 34 swively receives the lower end of a stem 35 rotatably supported by suitable glands 36 and packing 37 carried by a bonnet 38 on the casing 10. The stem 35 is in threaded engagement with a bushing 39 on the top of the bonnet and a hand wheel 40 or any other suitable means serves for actuating the stem 35 to operate the means 20 for the purposes mentioned.

Upward movement of the stem by rotating it counterclockwise causes the disk 19 to move from the closed to the open position and simultaneously changing its angularity to unbalance the disk. With the disk 19 in its closed position, as shown in Fig. 1, when the stem 35 is moved upwardly, a pulling force is applied to the disk at a point below the center of the disk through the intervention of the links 24, 22 and 23, pivot 29 and lug 30. At the same time, the disk 19 rocks on the pivot 27 out of its balanced closed position. The upper half of the disk moves away from the inlet side under pressure of the fluid while the lower half of the disk moves toward the inlet side. Thus pressure of the fluid aids in effecting the opening movement of the disk in conjunction with the pulling force applied by the stem 35 and means 20. As the rotation of the stem 35 continues, the disk 19 continues to travel toward the open position guided by the link 21 due to the connection of the latter with the fixed pivot 25. Meanwhile the disk assumes an angle approximately paralleling the longitudinal axis of the passage 11 when the disk reaches said axis, as shown in Fig. 2. The angular movement of the disk 19 is approximately ninety degrees. In so moving the disk 19 gradually offers less resistance and friction to the fluid. The disk 19 is finally brought to its fully open position into the space 15 clear of or entirely withdrawn from the passage 11, as shown in Fig. 3. When the disk is in the fully open position, it leaves the passage 11 wholly unobstructed for a maximum flow of the fluid, which has a straight clear path apparent in Fig. 3. In order to prevent excess movement of the disk, a stop 41 on the casing 10 is encountered by the disk which keeps the latter in a position from which it may be returned to the closed position, the parts operating reversely to that described above as will be understood.

In Fig. 4 the valve shown is similar to the one illustrated in Figs. 1, 2 and 3, except that the link 22 has one end thereof pivotally connected by the use of a pivot 42 in a fixed position on the casing 10.

In Fig. 5 a simplified provision and arrangement is shown for controlling the movement of the valve member or disk 19. In this case the disk has a single lug 43 on the inlet side. A link 44 has one end pivotally connected with the lug 43, as at 45, and the opposite end of the link is pivotally connected by means of a pivot 46 in fixed position on the casing 10. The outer end of the lug 43 is pivotally connected with the lug 33 on the coupling 34, as at 47. The disk 19 rocks on the pivot 45 into and out of the balanced and unbalanced positions while guided by the link 44 having the pivot 46 for an axis.

The modifications shown in Figs. 4 and 5 do not depart from the principle of operation set forth hereinabove and indicate possible changes within the spirit of the invention as expressed in the appended claims.

I claim:

1. In a valve, a casing having a flow passage extending therethrough and a space adjacent said passage and communicating therewith, a seat in said passage in axial alinement therewith, a valve member, and means pivotally connected with said casing and including means pivotally connected with said valve member operable to move the valve member between a closed position on said seat and an open position in said space to be clear of said passage, and in which movement the valve member also swings on its own pivot at the beginning of its opening movement off the seat and at the ending of its closing movement on the seat.

2. In a valve as set forth in claim 1, wherein said valve member swings on its own pivot approximately ninety degrees in moving between the open and the closed position.

3. In a valve, a casing having a flow passage extending straight through the same from its inlet to its outlet, said casing having a space adjacent said passage in communication therewith, a seat on said casing in axial alinement with said passage, a valve member, means pivotally connected with the casing and pivotally connected with the valve member for moving said valve member between a closed position seated on said seat and an open position in said space clear of said passage, said means including a connection enabling the valve member to rock during its movement out of its closed position to a partly open position and vice versa.

4. In a valve as set forth in claim 3, wherein said means includes links, there being a link whose opposite ends are pivotally connected with said casing and one side of said valve member respectively, a second link having one end pivotally connected with said valve member at the aforesaid side, and a third link whose opposite ends are pivotally connected with the casing and the second link respectively.

5. In a valve, a casing having a flow passage extending therethrough and a space communicating with said passage, a valve member for controlling the flow of fluid through said passage, means to cause movement of the valve member between a closed position to obstruct said passage and an open position into said space clear of said passage, and said means including a pivot on one side of the valve member causing the valve member to rock during its travel from the closed to the open position and vice versa.

6. In a valve as set forth in claim 1, wherein pivotal connection of said means with the valve member is at two points spaced from each other and at opposite sides respectively of the geometrical center of the valve member.

7. In a valve, a casing having a flow passage extending therethrough and a space communicating with said passage, a seat on said casing, a disk conforming to said seat to control the flow of fluid through said passage, a lug fixed on said disk at one side thereof, a link having one end pivotally connected with said casing and the other end pivotally connected with said lug, and actuating means pivotally connected with said lug beyond the pivotal connection of the link with the lug with respect to the aforesaid side of the valve member, the provision and arrangement being such that the disk may be moved between a closed position on said seat and an open position into said space, and that the disk may rock at the start of its opening movement and near the end of its closing movement.

8. In a valve, a casing having a flow passage extending therethrough and a space communicating with said passage, a valve member, a first pivot in fixed position on said casing, a second pivot on said valve member at one side thereof, a link having its opposite ends connected with said pivots respectively, and actuating means connected with said valve member operable to cause said valve member to simultaneously swing with said link on said first pivot, and the valve member to rock on the second pivot, between a closed position to obstruct said passage and an open position into said space.

9. In a valve as set forth in claim 8, wherein said actuating means includes an actuator and a coupling, said actuator having one end swivelly connected with said coupling, and said coupling being pivotally connected with said valve member on the side thereof having the second pivot.

10. In a valve as set forth in claim 8, wherein said actuating means consists of an actuator, a coupling, and a lug on said valve member on the side thereof having the second pivot, said actuator having one end swivelly connected with said coupling, and said coupling being pivotally connected with said lug.

HERMAN L. PAUL.